United States Patent [19]
Brooks et al.

[11] Patent Number: 6,047,312
[45] Date of Patent: Apr. 4, 2000

[54] SYSTEM FOR REPLICATING AND ASSOCIATING FILE TYPES WITH APPLICATION PROGRAMS AMONG PLURALITY OF PARTITIONS IN A SERVER

[75] Inventors: Matthew G. Brooks, Orem; Russell T. Young, Pleasant Grove, both of Utah

[73] Assignee: Novell, Inc., Provo, Utah

[21] Appl. No.: 08/816,256

[22] Filed: Mar. 13, 1997

Related U.S. Application Data

[63] Continuation-in-part of application No. 08/499,711, Jul. 7, 1995, Pat. No. 5,692,129
[60] Provisional application No. 60/013,331, Mar. 13, 1996.

[51] Int. Cl.[7] ............................ G06F 15/16; G06F 15/167
[52] U.S. Cl. .............................................. 709/203; 709/215
[58] Field of Search .................... 395/200.51, 200.47; 707/10, 1, 201, 203, 100; 709/203, 215

[56] References Cited

U.S. PATENT DOCUMENTS

| | | | |
|---|---|---|---|
| 4,555,775 | 11/1985 | Pike | 364/900 |
| 4,961,224 | 10/1990 | Yung | 380/25 |
| 5,109,486 | 4/1992 | Seymour | 395/200 |
| 5,261,098 | 11/1993 | Katin et al. | 707/1 |
| 5,265,250 | 11/1993 | Andrade et al. | 395/650 |
| 5,271,007 | 12/1993 | Kurahashi et al. | 370/85.1 |
| 5,276,883 | 1/1994 | Halliwell | 395/700 |
| 5,325,533 | 6/1994 | McInerney et al. | 395/700 |
| 5,341,478 | 8/1994 | Travis, Jr. et al. | 395/200 |

(List continued on next page.)

OTHER PUBLICATIONS

"Novell Modifies NDS to Create Launcher", E. Smalley, *PC Week*, Apr. 3, 1995, pp. 23–24.

Brainshare 1995 presentation notes, Mar. 20–24, 1995.

"Directory Map, Computer", *Expanded Class Definitions*, Jun. 5, 1992.

"Netware 4 for Professionals", D. Bierer et al., 1993 New Riders Publishing Chapters 6–14, pp. 476–490, 499, 761–762, 777–784, 1057, 1167–1184.

"System Management Server Functions", *Directions on Microsoft*, Jul./Aug. 1995, pp. 15–18, 20–21.

API Code, 1989–1995.

icon.c, icon–h source code, 1992.

Disk One (contains eighteen *.LIB, *.DLL files), 1993–1994.

"Distributed Object System Framework ORB", K. Seki et al., *NEC Research and Development*, Jul. 1994, pp. 292–297.

"Method for Administering Domain Application Settings", Anonymous, *IBM Technical Disclosure Bulletin*, Apr. 1994, p. 33.

"Graphical User Interface for the Distributed Computing Environment", Anonymous, *IBM Technical Disclosure Bulletin*, Jan. 1995, pp. 409–410.

(List continued on next page.)

*Primary Examiner*—Le Hien Luu
*Attorney, Agent, or Firm*—Computer Law

[57] ABSTRACT

A method and apparatus according to various aspects of the present invention provides a system for associating files with relevant application programs in a network. The applications are available on a network, suitably as application objects. Each application object also includes file type information associated with the application. When a user logs onto the network, the file type information is retrieved from each accessible application object. The application launcher stores the retrieved information in the local memory of the user workstation. When a file is selected at the user workstation, the user workstation checks its local memory for the file type information corresponding to the selected file. Because the information is periodically updated by the application launcher, the current information is available to associate a particular file type extension with an application stored remotely. As a result, the appropriate application may be initiated.

56 Claims, 7 Drawing Sheets

U.S. PATENT DOCUMENTS

| | | | |
|---|---|---|---|
| 5,349,642 | 9/1994 | Kingdon | 380/25 |
| 5,355,497 | 10/1994 | Cohen-Levy | 395/700 |
| 5,367,635 | 11/1994 | Bauer et al. | 395/200.51 |
| 5,412,772 | 5/1995 | Monson | 395/155 |
| 5,414,845 | 5/1995 | Behm et al. | 395/650 |
| 5,423,003 | 6/1995 | Berteau | 395/200 |
| 5,423,034 | 6/1995 | Cohen-Levy et al. | 707/10 |
| 5,442,791 | 8/1995 | Wrabetz et al. | 395/650 |
| 5,491,796 | 2/1996 | Wanderer et al. | 395/200.09 |
| 5,522,077 | 5/1996 | Cuthbert et al. | 395/700 |
| 5,539,870 | 7/1996 | Conrad et al. | 395/155 |
| 5,542,086 | 7/1996 | Andrew et al. | 395/600 |
| 5,572,724 | 11/1996 | Watanabe et al. | 395/616 |
| 5,592,676 | 1/1997 | Bonnafoux | 395/800 |
| 5,655,081 | 8/1997 | Bonnell et al. | 395/200.32 |
| 5,666,486 | 9/1997 | Alfieri et al. | 395/200.47 |
| 5,689,708 | 11/1997 | Regnier et al. | 395/682 |
| 5,692,129 | 11/1997 | Sonderegger et al. | 395/200.11 |
| 5,729,682 | 3/1998 | Marquis et al. | 395/200.12 |
| 5,758,355 | 5/1998 | Buchanan | 707/201 |
| 5,761,499 | 6/1998 | Sonderegger | 395/610 |
| 5,764,908 | 6/1998 | Shoji et al. | 395/200.47 |
| 5,768,511 | 6/1998 | Galvin et al. | 707/203 |
| 5,797,139 | 8/1998 | Amro | 707/100 |

OTHER PUBLICATIONS

K. McCloghrie et al., "Management Information Base for Network Management of TCP/IP–based Internets: MIB–II", Network Working Group, Mar. 1991, RFC 1212, pp. 1–15.

K. McCloghrie et al., "Management Information Base for Network Management of TCP/IP–based Internets: MIB–II", Network Working Groups, Mar. 1991, RFC 1213, pp. 1–53.

K. McCloghrie et al., "Management Information Base for Network Management of TCP/IP–based Internets", Network Working Group, May 1990, RFC 1156, pp. 1–70.

"Advantages of NAL.EXE—The Wrapper", Anon., www.novel.com/intranetware/ntint/nal–wrap.html, Dec. 20, 1996, pp. 1–5.

"The Application Identifier Key", Anon., *Microsoft Corporation*, 1997, pp. 1–2.

"Common Internet File Formats", E. Perlman et al., *Internet Literacy Consultants,* Dec. 19, 1995, pp. 1–7.

"The Filename Extension Key", Anon., *Microsoft Corporation,* 1997, pp. 1–3.

"Graphical User Interface for the Distributed Computing Environment", Anon., *IBM Technical Disclosure Bulletin,* Jan. 1995, pp. 1–2.

"Inside OLE Second Edition", K. Brockschmidt, *Microsoft Press,* 1995, pp. 65–73, 169–172, 226–237, 268–274, 277–301, 328–338, 617, 667–669, 830–833, 988, 989, 1126, 1145–1164.

"Integrating NT–delivered Applications with Novell Application Launcher (NAL)", Anon., www.novel.com/intranetware/ntint/nal–use.html, Dec. 20, 1996, pp. 1–5.

"Novell Application Launcher™", Anon., www.novel.com/managewise/NAL, no later than Mar. 7, 1997, p. 1.

"Novell Application Launcher™ White Paper", Anon., www.novell.com/managewise/NAL/white 1.html, no later than Mar. 7, 1997, 1–5.

"Novell Application Launcher™ Flyer", Anon., www.novell.com/managewise/NAL/nalflyer.html, no later than Mar. 7, 1997, pp. 1–5.

"Registering File Extensions", Anon., *Microsoft Corporation,* 1997, p. 1.

"Registering File Extensions: From April 1998 Microsoft Developer's Network CD", Anon., *Excerpted from "The Windows Interface Guidelines for Software Design",* 1995, pp. 1–14.

"Supporting Creation", Anon., *Microsoft Corporation,* 1997, pp. 1–2.

SYSTEM FOR REPLICATING AND ASSOCIATING FILE TYPES WITH APPLICATION PROGRAMS AMONG PLURALITY OF PARTITIONS IN A SERVER

CROSS-REFERENCES TO RELATED APPLICATIONS

This application is a continuation-in-part of U.S. patent application Ser. No. 08/499,711, filed Jul. 7, 1995, now U.S. Pat. No. 5,692,129, and is a nonprovisional application based on U.S. Provisional Application Ser. No. 60/013,331, filed Mar. 13, 1996.

BACKGROUND OF THE INVENTION

1. Field of the Invention

The invention relates to software for use in a network, and more particularly, to software for establishing an application associated with a selected non-executable file in a network environment.

2. Description of the Related Art

Computers have proven to be among the most powerful and versatile tools developed over the last several decades, and continue to improve as processing speeds rise, applications mature, and new innovations add functionality. A modem computer is considerably more powerful than computers only five or ten years old.

Although many computers are designed to operate as an isolated, standalone machine, systems designers commonly link multiple standalone computers into a network to facilitate communications and resource sharing. The network provides access to applications and devices to the various connected workstations so that the users may share these resources. In addition, the network facilitates communication among the workstations so that the users can exchange information. Many network schemes are known, including client/server, mainframe, and peer-to-peer systems.

The workstations in many networks are not merely dumb terminals, but retain many functions which allow them to operate as independent computers, even though many functions are provided by a connected computer, such as a server. Some useful features of standalone systems, however, conflict or defy compatibility with a network environment. For example, many standalone systems employ file typing to associate a file with a particular application and initiate that application. For example, in the WINDOWS 3.1 operating environment from MICROSOFT, a file manager program lists a series of files stored in a memory. The files may be associated with several different applications, such as a word processing, spreadsheet, or graphic design applications. While in the file manager program, a user may select one of the files for access, for example by using a pointing device like a mouse.

Individual files may include a file type extension, such as the last three letters in the name of the file, which corresponds to the relevant application. Such file type extensions indicate (to the file manager program) which application program is associated with the selected file. In the typical WINDOWS environment, the file manager accesses a local memory location which stores a table of file type extensions and a series of application identifiers to associate certain applications with particular file type extensions. The file manager then initiates the appropriate application and passes the file name to the application for access by the application.

In a network environment, however, many application programs typically reside on a remote computer, e.g. a server, to facilitate sharing of the application. As the applications become available or are updated on the remote computer, the file type information stored in the local memory of the workstation may become outdated. Consequently, a program such as the file manager may be unable to retrieve valid file type information from the local memory for a selected application stored on a remote computer. With respect to new applications resident at the remote computer, appropriate file type information may be nonexistent in the local memories of the network workstations. Thus, to ensure that the file type information is updated, the local memory of each workstation is individually adjusted each time the file type information for an application is added or changed at a great cost of administrator time and resources.

SUMMARY OF THE INVENTION

A system for associating file types with applications according to various aspects of the present invention provides alternative methods and apparatus for providing current file type information in a network environment. In a preferred embodiment, the applications are available on a network having a directory service. The applications are stored as objects on the network and are available through the directory service. Each application object (or an associated object in the directory service) includes file type information, and suitably other information, associated with the application. Such information may, for example, indicate if, which users are authorized to access particular applications.

The user workstations on the network include a system, for example an application launcher, for calling the application objects to identify which applications are available to the user or the workstation and for retrieving the file type information from the network server. The application launcher gathers the file type information and related information for each of the accessible applications and stores it in the local memory of the user workstation. Such updating of the file type information may be performed periodically, for example during a refresh cycle or upon logging onto the network, to ensure that the user workstations and the network server contain consistent information.

When a file is selected at the user workstation, the user workstation checks its local memory for the file type information corresponding to the selected file. Because the information is periodically updated by the application launcher, the current information is available to associate a particular file type extension with an application stored remotely. As a result, the appropriate application may be suitably initiated. In addition, because the file type information is stored with the application object, the file type information may be easily modified by adjusting the data stored in the application object. Consequently, individual adjustments to the local memories of the various workstations are unnecessary to update the file type information.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

DETAILED DESCRIPTION OF PREFERRED EXEMPLARY EMBODIMENTS

Figure 1:
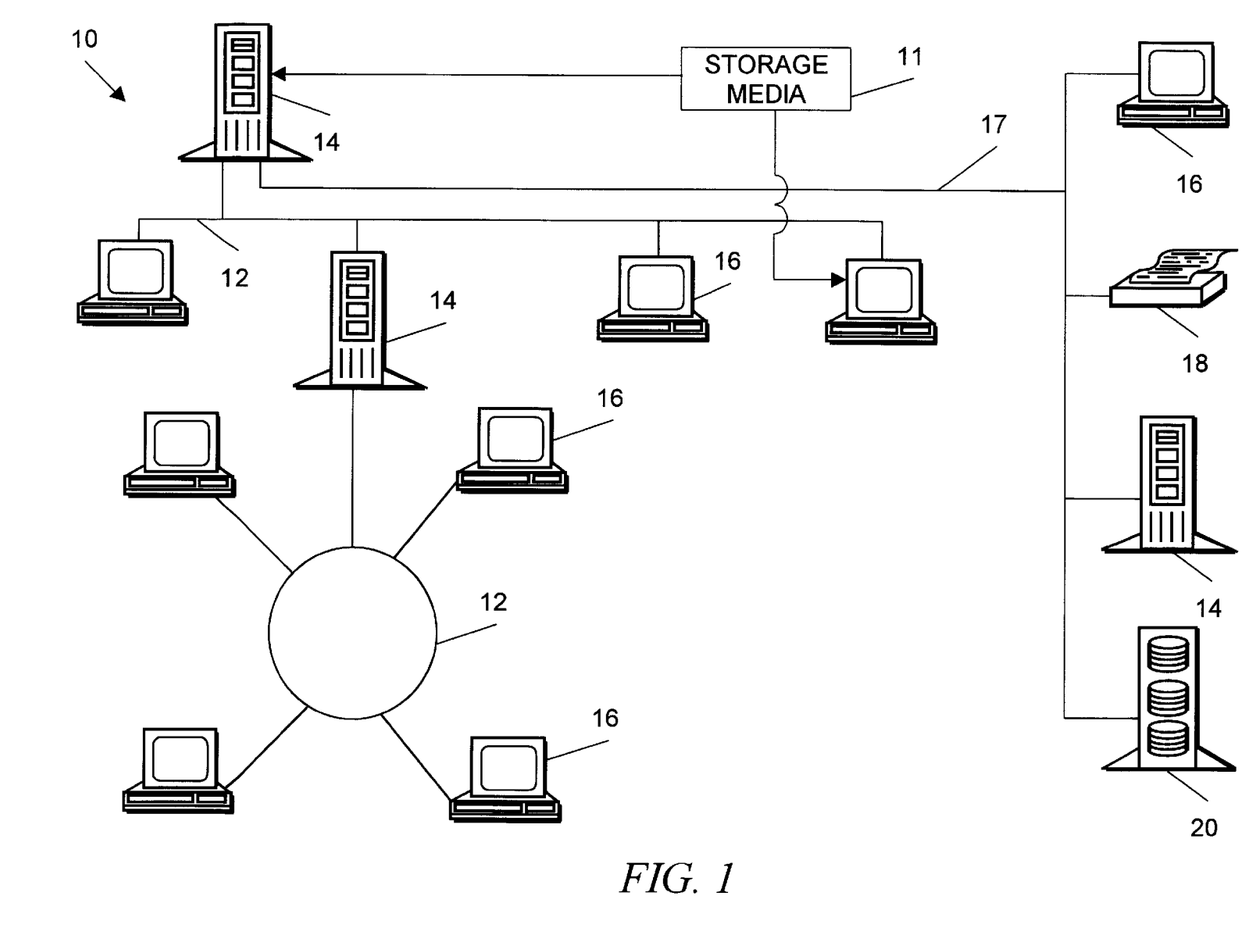
FIG. 1 is a diagram of a network according to various aspects of the present invention.

Referring now to FIG. 1, a suitable network 10 for use in accordance with various aspects of the present invention comprises at least one file server 14; at least one user station 16; and a communications medium 17. In one embodiment, the network 10 operates in conjunction with Novell NetWare software, version 4.x (NetWare is a registered trademark of Novell, Inc.). The network 10 is suitably configured as several interconnected local networks 12. Each local network 12 may also include a server 14 and one or more user stations 16. The network 10 and local networks 12 further suitably include one or more other devices, such as a printer 18 and a disk array 20. Although a particular network 10 is shown, the network 10 may comprise any suitable computer network in a variety of configurations.

The server 14 suitably comprises a conventional computer, preferably a high speed computer, for providing access to files, printing, communications, and other services available to users of the network. The server 14 is suitably accessed by users via user stations 16 to access applications, store files, communicate, and the like. The server 14 also suitably communicates with other servers 14 and various devices, such as the printer 18 and the disk array 20.

Each user station 16 suitably comprises a terminal connected to at least one of the servers 14. Preferably, the user station 16 includes an independent microprocessor capable of communicating with the server 14 to make use of the services provided by the server 14. For example, the user station 16 suitably comprises an IBM-compatible personal computer equipped with a network card to facilitate communication with the server 14. In addition, the user station 16 suitably operates using an operating system and/or environment. For example, the user station 16 suitably operates using an MS-DOS operating system from MICROSOFT and a WINDOWS 3.1 platform, also available from MICROSOFT. It should be noted, however, that the particular operating system or environment may be any suitable operating system or environment, including Windows 95, UNIX, or others. Further, the user station 16 may be configured as a portable computer that may be selectively connected to the network 10 to operate as a user station 16 and disconnected from the network 10 to operate as an independent, standalone system.

The communications medium 17 facilitates communications between the various components of the network 10. For example, the communications medium 17 may comprise a system of conventional network cables connected between the various components. Alternatively, the communications medium 17 suitably comprises any sort of communications system, including fiber optic, telephonic, microwave, cellular, or wireless communication systems. The devices connected to the network, such as the printer 18 and the disk array 20, also suitably comprise conventional devices for performing various tasks in conjunction with requests from network components.

Figure 2:
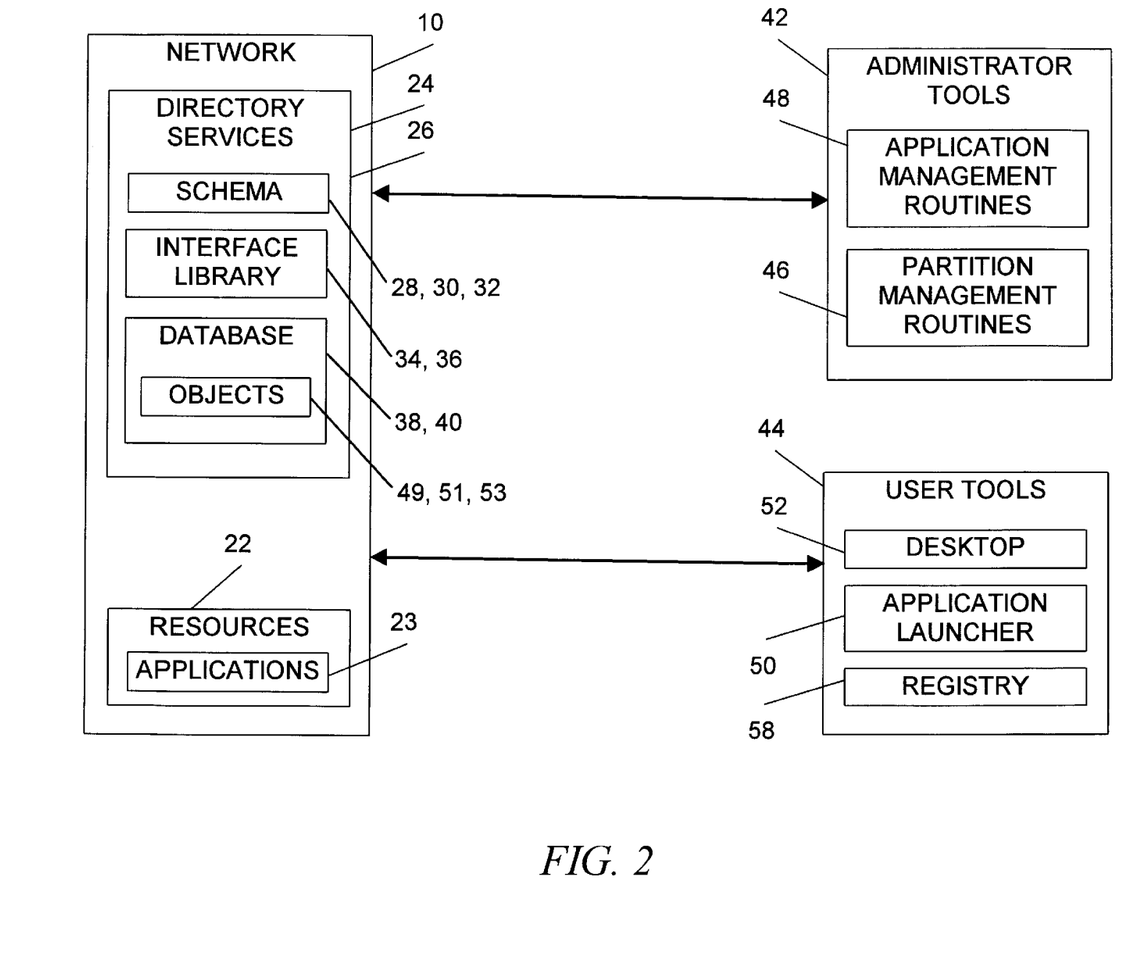
FIG. 2 is a diagram illustrating the interaction of various network components.

Referring now to FIGS. 1 and 2, administration and use of the network 10 are suitably supported by network software and hardware elements, administrator tools, and user tools. FIG. 2 illustrates an exemplary relationship between these components. In particular, the network 10 suitably includes a variety of accessible resources 22, such as an application 23 and data accessible to one or more of the file servers 14 and user stations 16.

In the present embodiment, the network resources 22 are administered through a directory services system 24. The precise nature of the directory services 24 may vary among different networks. In the present embodiment, the directory services system 24 operates on at least one of the servers 14 and suitably administers the location of the resources 22 and the rights of network users to use the resources 22. In a preferred embodiment, the directory services 24 include services provided by NetWare Directory Services ("NDS") software 26, which is commercially available from Novell, Inc. of Orem, Utah (NetWare Directory Services is a trademark of Novell, Inc.).

The directory services system 24 according to the present embodiment includes a schema 28; an interface library 34; and a database 38. The schema comprises a set of information relevant to the storage aspects of the database 38. For example, the schema 28 suitably includes a list of all of the fields in the database 38, the field types, the maximum and minimum acceptable values for each field, and information relating to the structure of the database 38. In a preferred embodiment, the schema 28 is an API-extensible schema in that the attributes and object classes found in the schema can be altered through an Application Programmers' Interface ("API") without direct access to the source code that implements the schema 28.

The interface library 34 provides access to the schema 28 and to the database 38. In some embodiments, the interface library 34 includes tables or commands stored in a file which are read by the schema 28 during its initialization and when objects are created to define the available attributes and classes. In addition or as an alternative, the interface library 34 may include a set of routines that are available to other programs to access and modify the schema 28. For example, the interface library 34 suitably includes an API that defines an interface to an NWDSxxx( ) library 36 which is commercially available from Novell, Inc. of Orem, Utah. The NWDSxxx( ) library 36 is so named because the names of functions and data types defined in the library 36 typically begin with "NWDS," an acronym for "NetWare Directory Services."

The database 38 suitably includes a "synchronized-partition" database. The database 38 is typically divided into two or more nonoverlapping partitions. To improve the response time to database 38 queries and to provide fault-tolerance, a replica of each partition is physically stored on one or more of the file servers 14 in the network 10. The replicas of a given partition are regularly updated by the directory services 24 through an automated synchronization process, consequently reducing the differences between replicas caused by activity on the network 10. In one embodiment, the database 38 includes a Novell NetWare Directory Services database ("NDS database") 40.

The database 38 further contains various database objects 49, 51. Objects 49 and 51 are suitably defined according to the schema 28 and the particulars of the network 10. These objects 49 and 51 represent resources 22 of the network 10, such as applications, files, and components. The database 38 is preferably a "hierarchical" database 38 because the objects 49 and 51 in the database 38 are connected in a hierarchical tree structure. Objects in the tree that can contain other objects are called "container objects." and are configured to be instances of a container object class.

Administration and use of the resources 22 are supported by the directory services 24, a set of administrator tools 42, and a set of user tools 44. The administrator tools 42 are suitably available to an administrator or administrative staff to control and manage the network 10. The administrator tools 42 suitably include partition management routines 46 for managing the partitions of the database 38. Further, the administrator tools 42 also suitably include application management routines 48 for creating, deleting, and modifying an application object 49 and/or desktop attributes for user, group, and a container object 51 in the database 38. As described further below, application objects 49 in the database 38 include an application program 23 and other information relevant to the application and its use on the network 10. The application objects 49 make application programs 23 available to network administrators and users alike.

The user tools 44 provide the user station and the user with various programs and mechanisms to manipulate data, suitably both independently and in conjunction with the network 10 and the resources 22. In a network system according to various aspects of the present invention, the user tools 44 suitably include an application launcher 50 for initiating applications 23 using corresponding application objects 49 in the database 38. For example, the NOVELL APPLICATION LAUNCHER may be provided as the application launcher 50. In addition, the user tools 44 further suitably include selected desktop environments 52, which may be modified by desktop attributes associated with database objects 49, such as user, group, and container objects, to facilitate the use of the application objects 49. User, group, container, and/or other objects 51 which have a desktop attribute are herein termed "desktop objects."

The user station 16 also suitably includes a memory system including a registry 58. The registry 58 suitably comprises a reserved section of memory resident on the user station 16 and used by the user station 16 for various functions. For example, in the WINDOWS 3.1 environment, the registry 58 is used to store, among other things, various information relevant to associating file type extensions with application programs 23 that may be stored in the database 38. For example, files may be selected at the user workstation 16 in programs such as the WINDOWS File Manager for execution. To determine the appropriate application to run to access the selected file, the file manager program accesses a library stored in the registry 58. The library contains information for matching various file type extensions with certain applications. Although the portion of memory is referred to as a registry 58, it should be noted that any suitable portion of memory may be used to perform the functions of the registry 58 in accordance with various aspects of the present invention.

The application management routines 48, as well as the schema 28, the database 38, and the registry 58, include tangible embodiments stored in one or more program storage devices 11. Suitable storage devices 11 include floppy disks, hard disks, tape, CD-ROMs, and other computer usable media. Each program storage device 11 is readable by one or more of the file servers 14 and user stations 16. Each program storage device 11 tangibly embodies a program, functions, or instructions that are executable by the server 14 and/or user station 16 to perform application managing steps.

As previously mentioned, database objects 49 represent various resources available on or otherwise associated with the network 10, such as application objects and desktop objects. For example, an application object 49 in the database 38 includes an application program 23 and a set of associated information relevant to the application program 23 and its use. The application objects 49 suitably render the application programs 23 available to network administrators and users alike. In a system according to various aspects of the present invention, an application object 49 representing an application program 23 and its associated information suitably includes a series of application attributes which indicate how the application program 23 is to be used and operated in the network 10. The application attributes are suitably modifiable by selected personnel, such as the network administrator. Thus, the administrator may control how the application program 23 is used and by which users, machines, groups, or the like.

For example, the application attributes suitably include an icon attribute containing some or all of a set of icon data. The icon attribute allows icons for all of the application objects 49 that are visible to the user to be obtained from the database 38. Each application object 49 further suitably includes a "file path" attribute. For example, a file path attribute may be set to have a value corresponding to the full path (including server name) to the application object's *.EXE, *.COM, *.BAT, or other executable file. In an alternative embodiment, the server name is maintained in a separate "server" attribute or a configurable default format. In some embodiments, the file path attribute is multi-valued rather than single-valued, and contains one or more executable file paths. Listing several file paths increases the possibility of launching an application program 23 in the event a particular server 14 becomes unavailable. The file path attribute is added to the generic application object's 49 class.

In some embodiments, fault tolerance is provided at a higher level by an application fault tolerance object 53 (FIG. 2). The application fault tolerance object 53 includes a list which references a plurality of application objects 49. One suitable embodiment of the list uses an "alternate application objects" attribute having a distinguished name attribute syntax and no flags. Alternatively, the alternate application objects attribute may be added to the generic application objects class.

In addition, application objects 49 suitably include file typing information associated with the application. The file typing information includes a set of information which may be associated with files corresponding to, generated by, or otherwise associated with the particular application. For example, if the application appends the file extension ".djn" to files it creates, this information may be reflected in the file typing information. In addition, the application object 49 further suitably includes information corresponding to an interface with the application program 23. For example, when a file is to be accessed following execution of the application, a particular format for the command line may be necessary to properly pass the file name to the application program 23. This information, referred to in this case as the file type command line parameters, is also suitably stored in the application object 49.

In a network 10 according to various aspects of the present invention, the application objects 49 are stored in the database 38 associated with the directory services 24. The application objects 49 may be stored in any suitable manner or organization. For example, the network administrator suitably places a set of application objects 49 in the same container object if they differ only in which server 14 (FIG. 1) holds the executable code. Thus, the application launcher 50 could easily locate a replacement application object 49 to launch if a server 14 or a portion of the communications medium 17 is lost. Alternatively, the "best" (i.e., newest, fastest, physically closest, located on least loaded server, or most reliable) version of an application 23 could be listed first, with less desirable versions following in order of decreasing desirability.

As previously indicated, the database 38 further suitably includes desktop objects, such as user objects, group objects, and container objects. The desktop objects are suitably associated with a particular user or user station 16. For example, a particular user may have a designated log in handle associated with a container object. Consequently, the user is subject to the terms of the container object represented by the desktop attributes in the container object, regardless of the particular user station 16 occupied by the user. Similarly, a particular user station 16 may be associated with a particular geographical object so that the attributes associated with the geographical object apply to the user station 16, regardless of the user occupying the user station 16. The desktop attributes may thus be used to organize users, stations 16, and other components of the network 10 to provide security and maximize the efficient use of network resources.

The application objects are available to at least a portion of the user stations 16 to request execution of application programs 23. To facilitate requests for execution, the user station 16 includes a suitable system for gaining access to particular applications via the application objects 49 in the database 38 using file typing information. In the present embodiment, the application launcher 50 performs various functions to associate file type extensions with the relevant application object 49 and initiate execution of the application program 23.

The application launcher 50 is suitably associated with the desktop environment 52. In some embodiments of the present invention, the application launcher 50 and the application management routines 48 are combined in a single tool, similar to the NWAdmin program available from NOVELL. These embodiments allow a user to readily browse or search for application objects 49 in the database 38 and to then launch that application object 49. Alternatively, the application launcher 50 may be configured to perform a search within the database 38 by searching the desktop attributes in one or more desktop objects 51.

In a preferred embodiment, the application launcher 50 is suitably initially stored at a public location on the network 10 where it can be downloaded by a user station 16 when the user logs onto the network 10, for example in conjunction with login scripts. In one embodiment of the application launcher 50, a program executed by the user station 16 reads a user object's container object in the database 38 when a user logs onto the network 10. The container object suitably includes a stream syntax "application launcher bootstrap" attribute which contains the executable code for the application launcher 50. Storing the application launcher 50 in a stream attribute provides the advantages of storage in the database 38, such as replication and distribution. Alternatively, the application launcher 50 may be stored on each individual user client 16 having access to the network 10. Execution of the application launcher 50 may be initiated automatically, for example following login, at the users's election, or via any other appropriate mechanism.

In a standalone configuration, the local registry 58 of the user station 16 suitably includes information, including file type information, for operating the user station 16 as a standalone computer. In the present embodiment, the local registry 58 of the user station 16 is reconfigured, for example by the application launcher 50, with registry information relevant to the application objects 49 in the database 38 which are accessible to the user station 16. In particular, the reconfiguration of the local registry 58 is suitably performed to provide file typing information corresponding to application programs 23 stored in the database 38.

Figure 3:
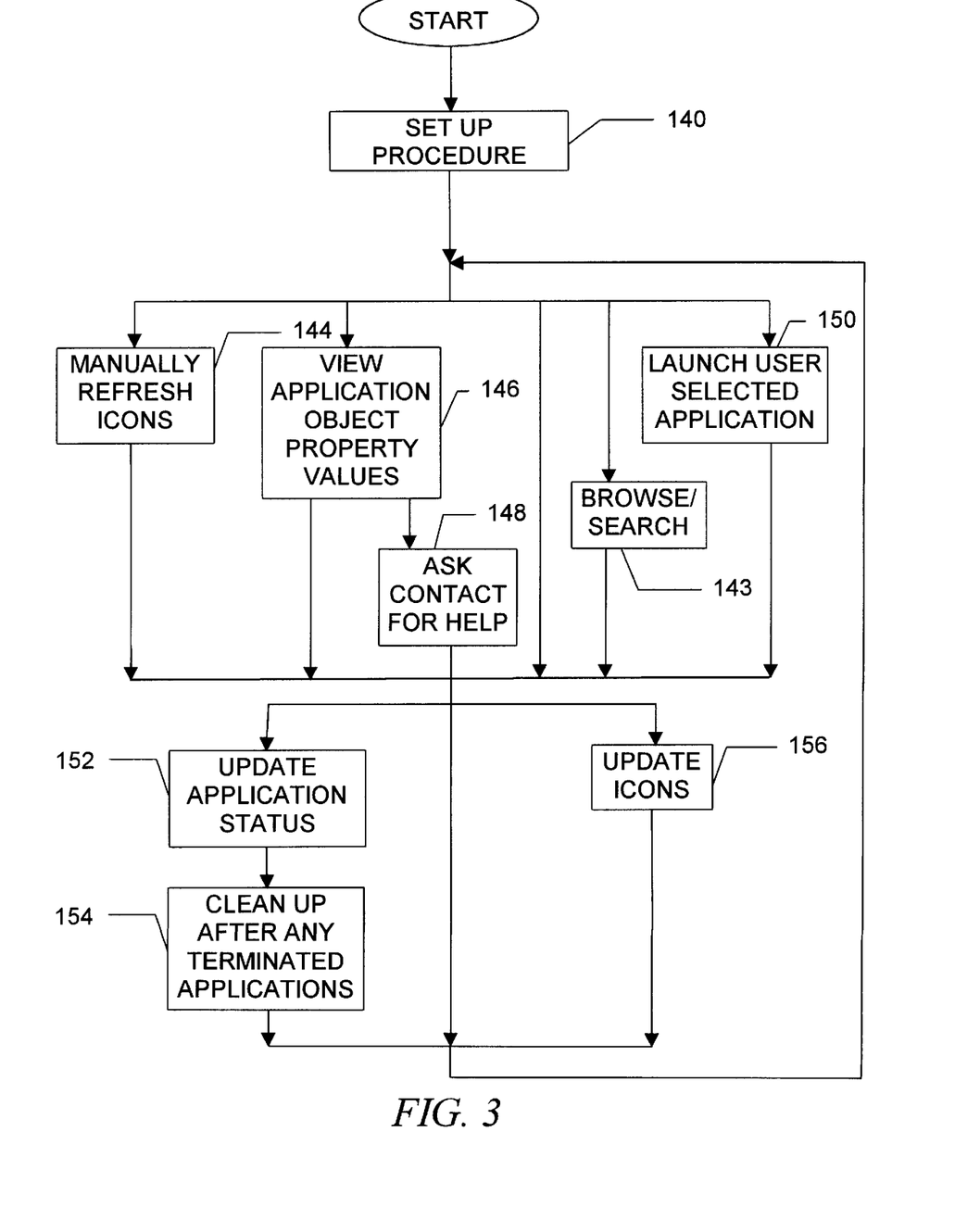
FIG. 3 is a general flow diagram of a process for accessing and updating applications and the like on the network of FIGS. 1 and 2.
Figure 4A:
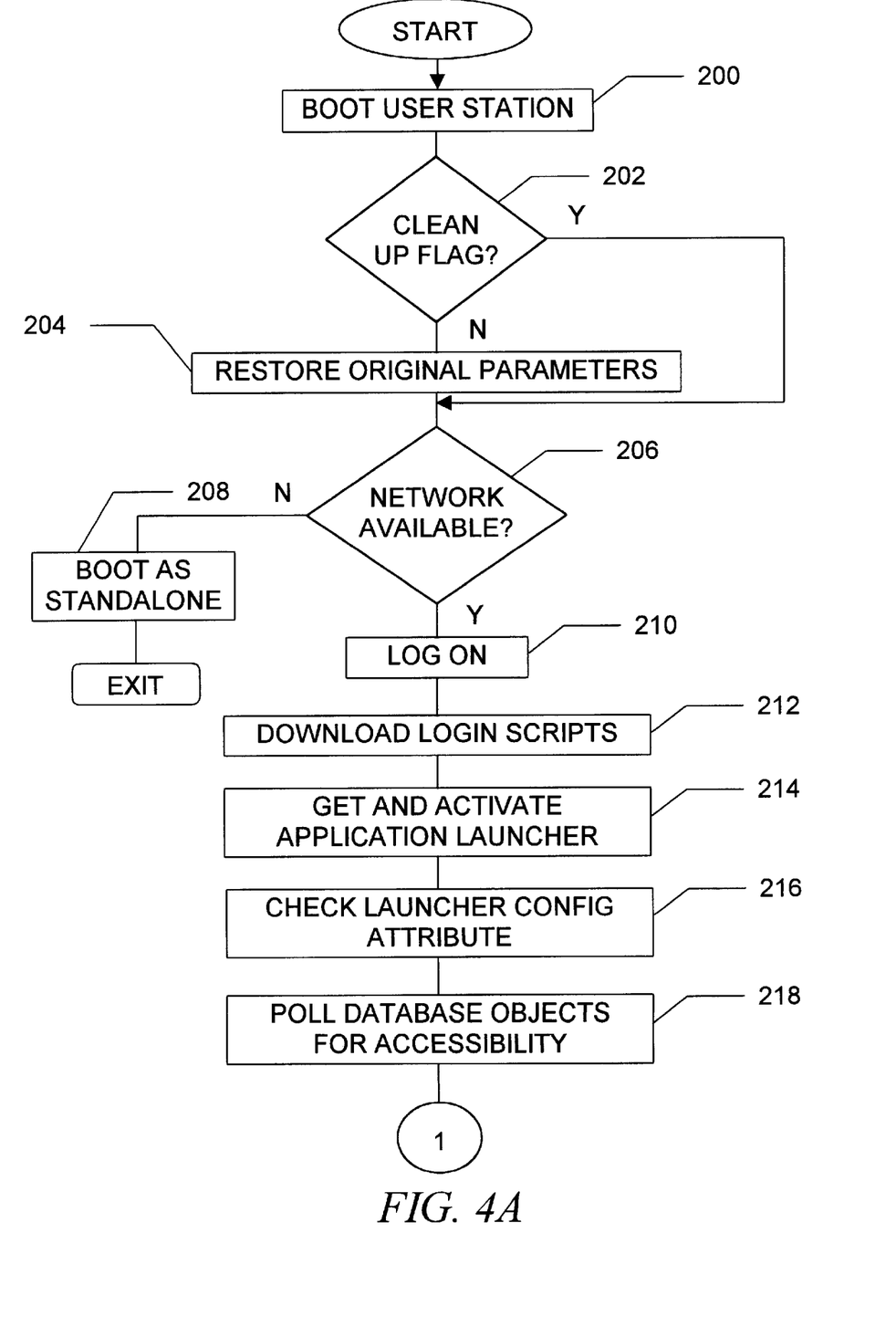
FIGS. 4A–B are a flow diagram of a setup procedure for the network.
Figure 4B:
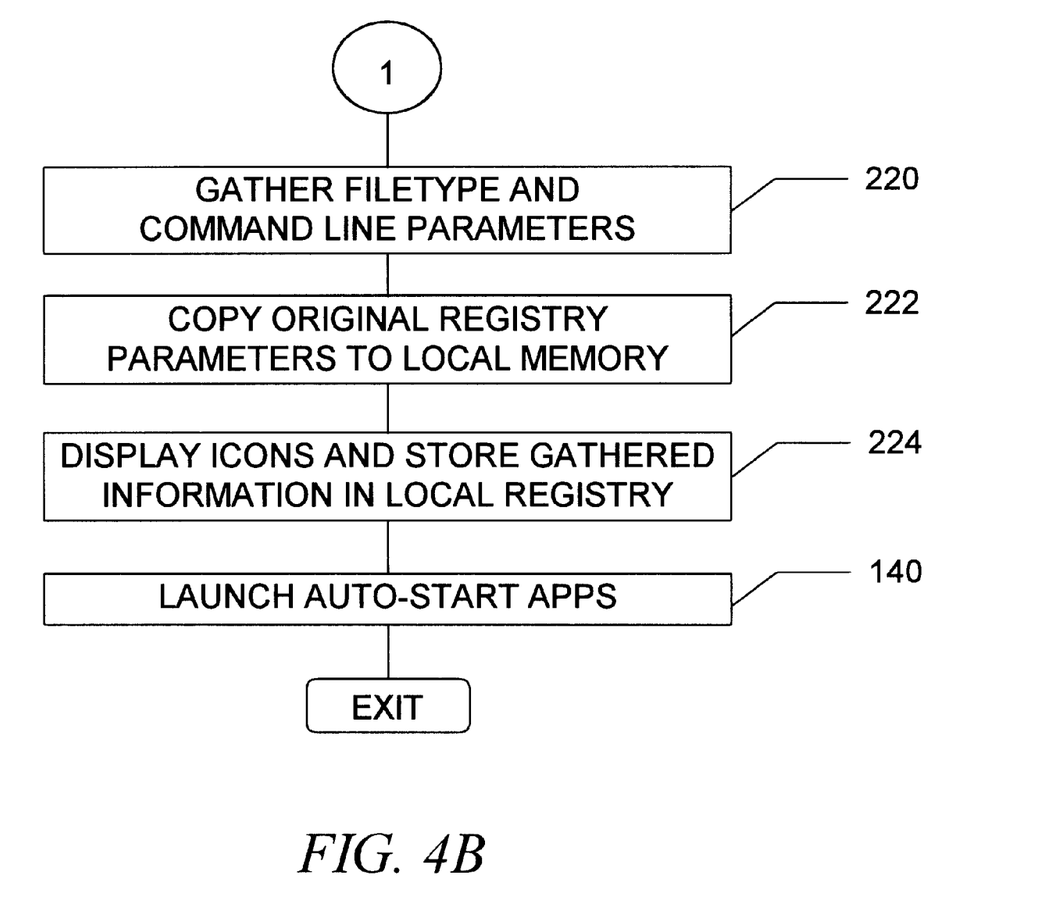

For example, referring now to FIGS. 3 and 4A–B, the user station 16 initially engages in a setup procedure to configure the user station 16 for its environment (step 140). First, the user station 16 powers up, initializes, and boots (FIG. 4, step 200). In one embodiment, during or following the boot up process, the user station 16 checks a clean up flag stored in its local memory (step 202). This flag is controlled by the application launcher 50, as described in greater detail as below. If the clean up flag indicates that a clean up process was not completed at termination of the previous application launcher session, the user station 16 retrieves a set of registry parameters from a preselected location in the local memory and places it in the registry 58 (step 204). As described below, the registry parameters retrieved from the preselected memory location are those parameters used by the user station 16 as a standalone system. In an alternative embodiment, however, the clean up process may be performed by the application launcher 50 after it is initiated, as described in greater detail below.

The user station 16 then attempts to log onto the network 10 (step 206). If the network 10 is not available, for example due to disconnection or the like, the user station 16 configures itself for standalone operation (step 208). If the network 10 is available, the computer logs onto the network 10, suitably using an appropriate user identification and security measures (step 210). Once access to the network 10 is gained, the user station 16 downloads a series of login scripts and executes them (step 212).

After the user station 16 is logged onto the network 10, the application launcher 50 is suitably activated to collect the registry information for the application objects 49 available to the user station 16 on the network 10 and to adjust the local registry 58 accordingly (step 214). If the application launcher 50 is already resident, the user station 16 may automatically execute the application launcher 50 following the login process. Alternatively, the application launcher 50 may be manually activated by the user or called by another program. In the preferred embodiment, however, the application launcher 50 is stored at a public location, for example in the directory services database 38. The application launcher 50 may then be downloaded, such as during execution of the login scripts.

Upon execution, the application launcher 50 reads the current value of a launcher configuration attribute from the database 38 and stores that information in a local buffer (step 216). The launcher configuration attribute includes information relating to the application launcher 50, such as which or how many container objects are associated with the user and whether the icon information should be automatically refreshed.

The application launcher 50 then determines which application objects are accessible to the user station 16, i.e. the desktop objects. In a preferred embodiment, the application launcher 50 uses the information in the launcher configuration attribute to identify the container objects accessible to the user and user station 16. The application launcher 50 then suitably checks each application object 49 in each accessible container object designated by the launcher configuration attribute (step 218). If the user station 16 is authorized to access the application object 49, the application launcher 50 collects the icon information and file type information from the application object 49 (step 220). For example, the application launcher 50 may be configured to poll each of the accessible application objects 49, and to continue polling the application objects 49 at selected intervals to update the resources available to the user station 16. As previously indicated, the icon for an application program 23 is preferably stored in the icon attribute in addition to its usual storage in the application program's 23 executable file. Accordingly, the application launcher 50 collects the icons of all applications 23 listed in the desktop attribute. Similarly, the file type information and the command line parameters are also stored in the object and are accessible to the application launcher 50.

When each of the application objects 49 have been checked, the application launcher 50 copies the information currently in the user station 16 registry and stores it in the preselected location for the original registry information, as mentioned above (step 222). The application launcher 50 then displays the icons associated with the accessible applications. In addition, the application launcher 50 reconfigures the information in the registry 58 to include the file type information in the local registry 58 for each of the accessible application objects 49 (step 224). In particular, the application launcher 50 reconfigures the registry information so that if a match between a file type extension and an application object 49 occurs, the application launcher 50 is called, regardless of the relevant application object 49. In a preferred embodiment, the application launcher 50 reconfigures the registry 58 such that the application launcher 50 is called only if an application object 49 is called, and not in the event that a locally stored program is desired. As described in greater detail below, the application launcher 50 then initiates execution of the relevant application 23, checks the command line parameters in the application object 49 for the particular application 23, and provides the file name to the application 23 in the proper format.

If desired, the application launcher 50 may be configured to perform an auto start launching step 140 to launch a set of applications 23 specified in an auto start attribute of the desktop object 51 (step 140). The procedure for launching applications is described in greater detail below. As elsewhere, error messages are provided to the user and/or to the network administrator if an attempted step fails.

Referring again to FIG. 3, after the setup procedure is completed, the launcher 50 responds to commands or events provided by the user. One such command orders the launcher 50 to perform a manual icon refresh step 144. Icon refresh is useful because the network administrator may have added new application objects 49 to those available to the user, may have deleted other application objects 49, and/or may have changed the current attribute values of still other application objects 49 after the launcher 50 last read those values.

The application launcher 50 maintains an internal list of application objects 49 for which icons are currently displayed. A refresh process (step 144) causes the application launcher 50 to scan a portion of the database 38 to determine whether the application launcher's 50 internal list differs from the attributes listed in the desktop attribute of the desktop 52 in the database 38. The portion of the database 38 hierarchy to be searched is specified by the container levels value stored in the launcher configuration attribute of the user and container objects. In one embodiment, time stamps are used to detect changes to the database 38. Alternatively, a string comparison may be used to detect name changes. Any differences detected are reflected in the internal list and other internal data of the application launcher 50 and in the icons displayed on the user station 16 screen.

In addition, with continued reference to FIGS. 2 and 3, the application launcher 50 also performs certain procedures not directly requested by the user. For instance, the application launcher 50 maintains an internal structure that reflects the current status of each application 23 launched by the application launcher 50. This status information includes user interface information such as drive mappings, printer port captures, and server attachments made by the application launcher 50 before launching an application 23, and an indication whether the application 23 has terminated. The application launcher 50 detects termination of an application 23 by polling, by an interrupt or event notification, or by other familiar means. Changes in the application's 23 status are reflected in the application launcher's 50 internal structure during a status updating procedure (step 152).

If the launcher configuration attribute indicates that icons should be automatically refreshed, then an icon updating procedure (step 156) is also performed without a direct user request. Aside from being initiated by the application launcher 50, the icon updating procedure is substantially similar to the user-initiated manual icon refresh procedure. Both of these procedures are performed to reduce the workload of the network administrator by reducing or eliminating the need for the administrator to manually update user desktops 52 after changing the application objects 49 in the schema database 38.

Figure 6:
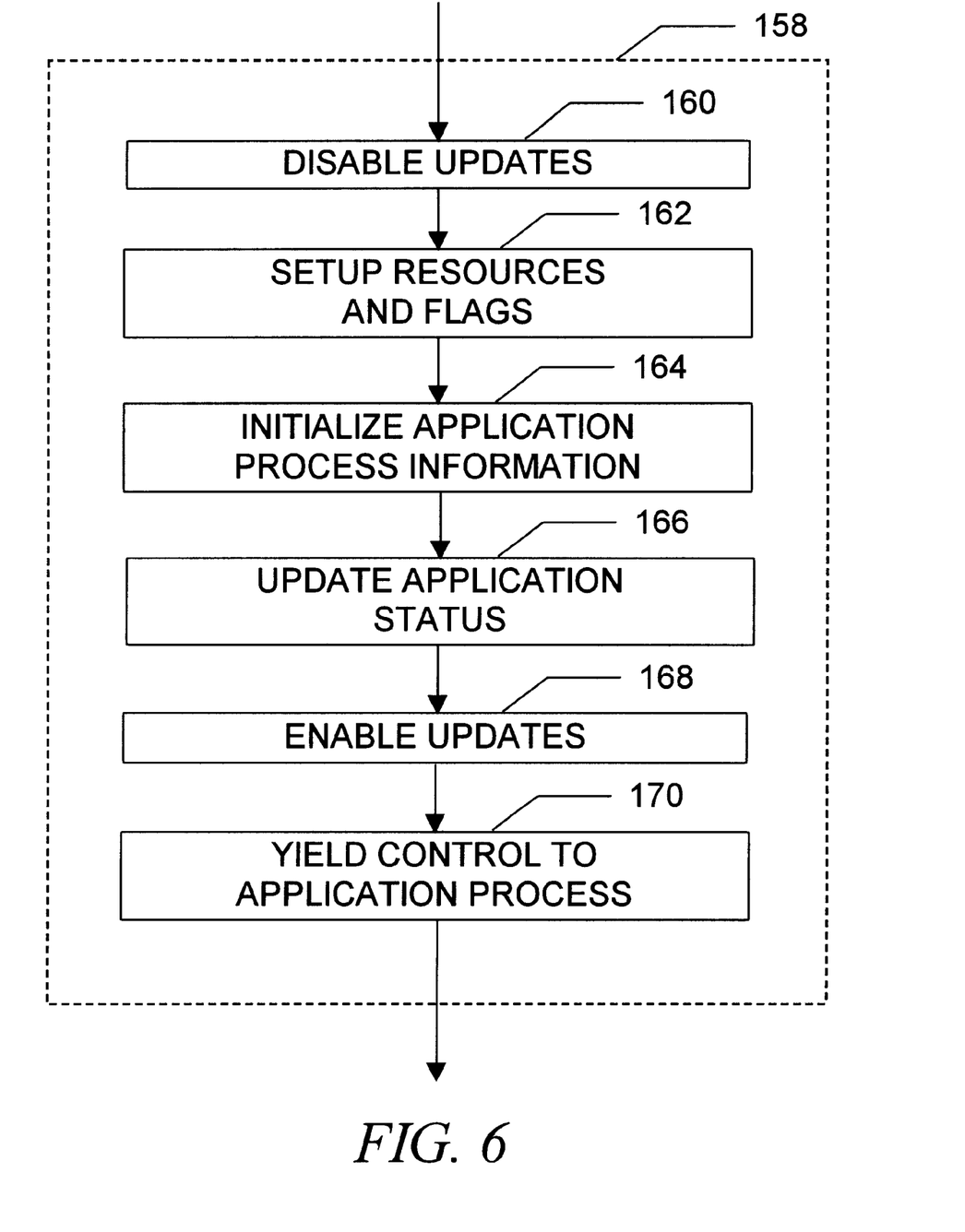
FIG. 6 is a flow diagram of an application launching process.

The user may also select a specific application 23 and order the application launcher 50 to initiate execution of the selected application 23 (step 150). In an embodiment tailored to the WINDOWS environment, the application 23 is selected for launching by double-clicking a mouse button after positioning a desktop cursor over the application's 23 displayed icon. With reference to FIGS. 2 and 6, launching an application 23 includes executing a launching process for the selected application 23 (step 158). To launch a user selected application 23, the launching process is performed only once, whereas if the application launcher is configured to execute an auto start of one or more applications 23, the launching process is executed repeatedly, with one repetition being performed for each application 23 specified in the auto start attribute of the desktop 52.

In the present embodiment, the launching process includes a disabling procedure (step 160) which disables both the application status updating procedure (step 152) and the automatic icon updating process (step 156). Disabling the updating procedures simplifies the launching process by preventing inconsistencies in the application launcher's 50 status information.

A resource setup routine then sets up resources needed by the application 23 that is being launched (step 162). The resource setup routine also sets standard flags that communicate with operating system process creation routines. A process initialization routine (step 164) invokes an operating system routine or other process initializer to initialize a process control block or similar process control structure used by the operating system. The process initialization routine also allocates a processor to a process, task, or thread corresponding to the application 23. In an embodiment tailored to the WINDOWS environment, the process initialization routine includes a call to, for example, the ShellExecute( ) or CreateProcess( ) modules.

An update status routine (step 166) then updates the application launcher's 50 internal application status information to indicate that the application 23 has been launched. In one embodiment, the step 166 also records a process ID, instance handle, task handle, or other process identifier supplied by successful completion of the process initializer routine.

An enabling procedure (step 168) then reverses the disabling effects of the previous disabling procedure. This allows the updating procedures to proceed again. If the user interface was changed during the disabling procedure to indicate that launching is underway, such as by displaying an hourglass cursor, then that change is also reversed.

During a yielding procedure (step 170), a control transferor transfers control of a processor in the network 10 to the process initialized during the process initialization routine. The application launcher 50 suspends itself, invokes a sleep function, or otherwise yields control of the processor to the newly launched process of the application 23 to allow execution of the application program. In one embodiment tailored to the WINDOWS environment, the yield procedure includes a call to, for example, the Yield( ) routine.

Other embodiments of the invention may include different procedures which to accomplish substantially the same results as the described launching process. For instance, the process initialization routine may be combined with the yielding procedure in environments which provide a single system call to create a new process and pass control to that process. In some such embodiments, the relative order of the disabling procedure and the setup resources procedure is reversed. In addition, the disabling procedure and the enabling procedure are omitted in embodiments which do not use interrupt or event paradigms. That is, the disabling procedure and the enabling procedure are omitted when there is no risk of creating inconsistent status information in the launcher 50 during the launching process.

Further, in accordance with various aspects of the present invention, the user may select a file for access and automatically initiate execution of the relevant application 23 and accessing of the file. When a file is selected for access, the application launcher 50, using the file type extension portion of the filename, accesses the information stored in the local registry 58 to find the application 23 associated with the file type extension. The application launcher 50 further suitably initiates execution of the appropriate application 23. Moreover, the application launcher determines the format required by the application program 23 to provide the file name to the application program 23, and proceeds to provide the file name to the application in the proper format.

Figure 5:
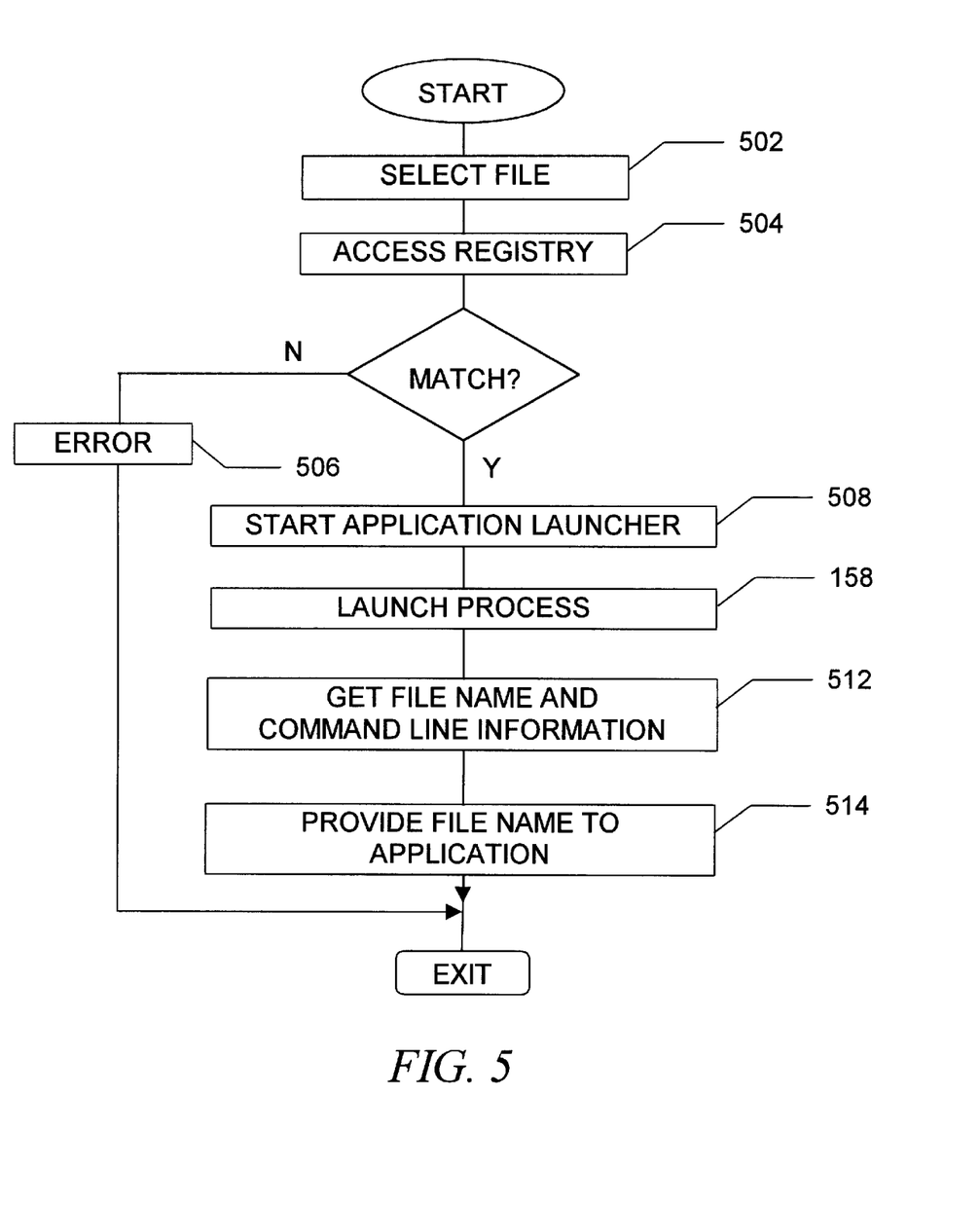
FIG. 5 is a flow diagram of a procedure for launching an application using file type extensions.

For example, referring now to FIG. 5, a user may select a particular file for access, for example by positioning the cursor over the file name or icon and double-clicking the appropriate mouse button (step 502). The operating system or other relevant software, such as the file manager program in the WINDOWS environment, accesses the local registry 58 to identify the application program 23 corresponding to the file type extension of the selected file (step 504). If no match occurs, an error message is returned (step 506). If a corresponding application object 49 is found via the registry 58, the information stored in the registry 58 directs the system to call the relevant application program 23. If the application program 23 is a locally stored application, the application is initiated conventionally. If the application program 23 is a shared application stored in the database 38, however, the application launcher 50 is called, regardless of which application object 49 corresponds to the file type extension (step 508).

When the application launcher 50 activates, the application launcher 50 calls the application program 23 associated with the relevant application object 49 to initiate execution of the application program 23 by executing the launching process (step 158). The application launcher 50 further reads the command line information from the application object 49 to determine the appropriate format in which to provide the file name to the application program 23 (step 512). The application launcher 50 then places the file name in the appropriate format as indicated by the file type command line parameters and provides it to the application program 23 (step 514). Alternatively, the application launcher 50 may be registered as a DDE protocol server. In this configuration, the application launcher 50 provides the file name to the application program 23 in the appropriate form via a DDE exchange using the DDE format.

When the application launcher 50 terminates, the application launcher 50 updates the status information and cleans up during a cleaning process (step 154). The cleaning process, which proceeds according to the settings in the application object's flags attribute, possibly includes unmapping drives, releasing captured printer ports, detaching from servers 14, and releasing memory used internally by the application launcher 50 to hold the application's status information. Further, upon request by the user to exit the application launcher 50, the application launcher 50 copies the original registry information from the user station's 16 memory into the registry 58. In addition, the application launcher 50 suitably sets the cleanup flag to indicate that the cleanup was properly performed.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

We claim:

1. A computer-implemented method of providing, to a user computer, file type extension data associated with a plurality of application objects stored with associated attributes in a synchronized-partition database in a memory associated with a server, wherein at least one of the application objects has an attribute representing an application program and that application object includes at least one file type extension indicia corresponding to the application program, comprising the steps of:

establishing a communication link between the server and the user computer;

transferring the at least one file type extension indicia from the at least one of the application objects to a memory associated with the user computer via the communication link;

receiving input data at the user computer, wherein the input data identifies a file type extension which corresponds to the application program represented by the application object attribute; and identifying the application program corresponding to the file type extension according to the application object file type extension indicia which was previously transferred to the memory associated with the user computer.

2. The method of claim 1, wherein at least one of the application objects includes an icon indicia, further comprising the steps of:
   transferring the icon indicia from the at least one of the application objects to the memory associated with the user computer; and
   displaying an icon corresponding to the icon indicia at the user computer.

3. The method of claim 1, further comprising the step of replicating at least one of the application objects and its file type extension indicia among a plurality of partitions of the database.

4. The method of claim 1, wherein the application objects are organized in a hierarchical structure.

5. The method of claim 1, wherein the step of transferring the at least one file type extension indicia comprises the steps of:
   identifying a user account to be accessed via the user computer;
   determining whether an access to the application program by the user account is authorized; and
   copying the file type extension indicia to the memory associated with the user computer only if the access to the application program by the user account is authorized.

6. The method of claim 1, further comprising the steps of:
   copying a second file type extension indicia stored at the first location in the user computer memory to a second location in the user computer memory; and
   storing the first file type extension indicia associated with the application objects at the first location in the user computer memory.

7. The method of claim 6, further comprising the step of determining whether the server is responsive to the user computer, and wherein the steps of copying a second file type extension indicia and storing the first file type extension indicia are performed only if the server is responsive to the user computer.

8. The method of claim 1, wherein at least one of the application objects includes at least one command line parameter, and further comprising the step of transferring the at least one command line parameter specifying a format from the at least one of the application objects to the memory associated with the user computer.

9. The method of claim 8, further comprising the step of initiating the application program corresponding to the file type extension and passing the file name to the application program in the format specified by the command line parameter.

10. The method of claim 1, wherein at least one of the step of identifying the application object and the step of transferring the file type extension data is initiated by an application launcher.

11. The method of claim 1, further comprising the step of initiating an application launcher prior to the step of identifying the application program, and during the initiating step the application launcher determines which application objects are accessible to the user computer.

12. The method of claim 1, wherein the at least one of the application objects further includes a command line parameter, further comprising the steps of:
   transferring the command line parameter from the at least one of the application objects to the memory associated with the user computer via the communication link;
   initiating the application program corresponding to the file type extension; and
   passing the file name to the application program in the format specified by the command line parameter.

13. A computer-implemented method of providing file type extension information associated by application objects with a plurality of programs stored on a server, the application objects defined according to a database schema, wherein at least one of the plurality of programs is available to a user account accessible via a user computer, comprising the steps of:
   establishing a communication link between the server and the user computer;
   collecting file type extension information from at least one application object associated with the at least one program available to the user account from the server;
   transferring the file type extension information associated with the at least one program to the user computer via the communication link; and
   replicating among a plurality of partitions at least one application object which associates the at least one program available to the user account and the file type extension information.

14. The method of claim 13, further comprising the steps of:
   collecting an icon indicia associated by an application object with the at least one program available to the user account from the server;
   transferring the icon indicia from the server to the user computer; and
   displaying an icon corresponding to the icon indicia at the user computer.

15. The method of claim 13, wherein the step of transferring the file type extension information comprises the steps of:
   identifying the user account to be accessed via the user computer;
   determining whether an access to the at least one of the plurality of programs by the user account is authorized; and
   copying the file type extension information to the memory associated with the user computer only if the access to the application program by the user account is authorized.

16. The method of claim 13, further comprising the steps of:
   copying a second file type extension information stored at a first location in a memory associated with the user computer to a second location in the memory associated with the user computer; and
   storing the file type extension information associated with the at least one program at the first location in the user computer memory.

17. The method of claim 13, wherein the at least one program available to the user account corresponds to at least one command line parameter specifying a format, and further comprising the step of transferring the at least one command line parameter from the server to the user computer via the communication link.

18. The method of claim 17, further comprising the steps of:
   receiving input data at the user computer, wherein the input data identifies a file having a file type extension, wherein the file type extension corresponds to the at least one program available to the user account;

initiating the at least one program available to the user account corresponding to the file type extension; and passing the file name to the application program in the format specified by the command line parameter.

19. The method of claim 13, wherein at least one of the step of collecting file type extension information and the step of transferring the file type extension information is initiated by an application launcher.

20. The method of claim 13, further comprising the steps of:

collecting at least one command line parameter specifying a file name format associated by an application object with the at least one program available to the user account from the server;

transferring the at least one command line parameter to the user computer via the communication link;

initiating the at least one program; and passing a file name to the application program in the format specified by the at least one command line parameter.

21. A computer system using file type extension information, comprising:

a server having a memory, the server memory containing a plurality of application objects, each of which represents one or more programs and includes at least one file type extension indicia, wherein at least one of the plurality of programs is associated by at least one application object with the at least one file type extension indicia, and wherein the server memory includes a plurality of partitions, and at least one of the plurality of programs and the at least one file type extension indicia are replicated among the plurality of partitions; and a workstation having a memory, wherein the workstation is configured to be selectively connected to the server, including:

a retrieval system configured to be selectively connected to the server for retrieving the at least one file type extension indicia from the application object in the server memory; and a storage system responsive to the retrieval system for storing the at least one file type extension indicia retrieved from the server memory in the workstation memory.

22. The computer system of claim 21, wherein the workstation further includes an application initiation system, including:

a selection system for receiving selection data specifying a file having a file extension stored in the workstation memory for access;

an identifying system for identifying the at least one of the plurality of programs corresponding to the file extension based on the file type extension indicia stored in the workstation memory;

an initiation system for initiating the identified at least one of the plurality of programs associated with the file type extension indicia; and a file name system for passing the file name to the initiated at least one of the plurality of programs in the format specified by the command line parameter.

23. The computer system of claim 22, wherein the application initiation system includes an application launcher.

24. The computer system of claim 21, wherein at least one of the plurality of programs is associated with an icon indicia by an application object stored in the server memory, the retrieval system is configured to be selectively connected to the server for retrieving the icon indicia from the application object in the server memory, the workstation further comprising a display system configured to display an icon corresponding to the icon indicia.

25. The computer system of claim 21, wherein the application objects which represent the plurality of programs are organized in a hierarchical structure.

26. The computer system of claim 21, wherein the user computer operates in conjunction with a selected user account among a plurality of user accounts, access to the at least one of the plurality of programs is authorized for at least one of a plurality of user accounts, and wherein said retrieval system is configured to retrieve the at least one file type extension indicia only if the selected user account is authorized to access the at least one of the plurality of programs.

27. The computer system of claim 21, wherein the workstation memory contains an outdated file type extension indicia at a first location in the workstation memory, and said storage system is further configured to copy the outdated file type extension indicia to a second location in the workstation memory and store the file type extension indicia retrieved from the server at the first location in the workstation memory.

28. The computer system of claim 27, wherein the storage system is configured to copy the outdated file type extension indicia to a second location in the workstation memory and store the file type extension indicia retrieved from the server at the first location in the workstation memory only if the server is responsive to the workstation.

29. The computer system of claim 21, wherein the at least one of the plurality of programs is associated with at least one command line parameter specifying a format stored in the server memory and the retrieval system is configured to be selectively connected to the server for retrieving the command line parameter from the server memory.

30. The computer system of claim 29, wherein the workstation further includes an application initiation system, including:

a selection system for receiving selection data specifying a file having a file extension stored in the workstation memory for access;

an identifying system for identifying the at least one of the plurality of programs corresponding to the file extension based on the file type extension indicia stored in the workstation memory;

an initiation system for initiating the identified at least one of the plurality of programs associated with the file type extension indicia; and a file name system for passing the file name to the initiated at least one of the plurality of programs in the format specified by the command line parameter.

31. The computer system of claim 21, wherein the retrieval system includes an application launcher.

32. A computer system using file type extension information, comprising:

a network including a database having a plurality of application objects, wherein at least one of the application objects includes an application program and file type extension data associated with the application program, wherein the database includes a plurality of partitions, and the plurality of application objects is replicated among the plurality of partitions;

a user workstation configured to be selectively connected to the network, including:

a memory, including:

a registry portion of the memory; and at least one file stored in the memory, wherein the file is associated with the application program and has a file type extension; and an application launcher operating on the user workstation, wherein the application launcher includes:

a transfer system configured to be selectively connected to the database for transferring the file type extension data from the at least one of the application objects to the registry;

an identification system having access to the memory for identifying the application program associated with the at least one file according to the file type extension data in the registry and the file type extension of the file; and an application initiation system responsive to the identification system and configured to be selectively connected to the network for initiating execution of the application program.

33. The computer system of claim 32, wherein the identification system includes:

a selection system connected to an input device for receiving selection data from the input device specifying the at least one file for access; and a matching system responsive to the selection system for matching the file type extension of the at least one file with the application program associated with the file based on the file type extension data transferred to the registry and the file type extension of the at least one file.

34. The computer system of claim 32, wherein the at least one of the application objects further includes a command line parameter specifying a format for providing a file name to the application program, and the transfer system is further configured to be selectively connected to the database for transferring the command line parameter from the at least one of the application objects to the memory.

35. The computer system of claim 34, wherein the application initiation system includes:

an launching system configured to be selectably connected to the network for launching the identified application program associated with the at least one file; and a file name system having access to the memory and responsive to the launching system for passing the file name to the initiated at least one of the plurality of programs in the format specified by the command line parameter.

36. The computer system of claim 34, wherein the application initiation system includes an application launcher.

37. The computer system of claim 32, wherein the at least one of the application objects includes an icon indicia stored in the database, the transfer system is configured to be selectively connected to the database for transferring the icon indicia from the database to the user workstation memory, the user workstation further comprising a display system configured to display an icon corresponding to the icon indicia.

38. The computer system of claim 32, wherein the plurality of application objects is organized in a hierarchical structure.

39. The computer system of claim 32, wherein the user workstation operates in conjunction with a selected user account among a plurality of user accounts, access to the application program is authorized for at least one of the plurality of user accounts, and wherein said transfer system transfers the file type extension data only if the selected user account is authorized to access the at least one of the plurality of programs.

40. The computer system of claim 32, wherein the user workstation memory contains outdated file type extension data in the registry, and the transfer system copies the outdated file type extension data to a backup location in the workstation memory prior to transferring the file type extension data from the at least one of the application objects to the registry.

41. The computer system of claim 40, wherein the transfer system copies the outdated file type extension data to a backup location in the workstation memory prior to transferring the file type extension data from the at least one of the application objects to the registry only if the user workstation is connected to the network.

42. A computer-implemented method for executing a program represented by an attribute of an application object to access a data file having a name and a file type designator via a workstation, comprising the steps of:

selecting the data file at the workstation using an input device connected to the workstation;

identifying the program for accessing the data file according to the file type designator and at least one file type designator datum stored in at least one of a server and the workstation;

initiating execution of the identified program on at least one of the server and the workstation;

determining a file name format associated by the application object with the identified program according to the file type designator and at least one command line parameter stored in the application object on at least one of the server and the workstation;

formatting the file name of the data file in the determined file name format; and providing the formatted file name to the executing program.

43. The method of claim 42, further comprising the step of transferring the at least one file type designator datum stored in the server to the workstation.

44. The method of claim 43, further comprising the steps of:

copying an outdated file type designator datum stored at a first location in the workstation to a second location in the workstation; and storing the file type designator datum from the server at the first location in the workstation.

45. The method of claim 44, further comprising the step of determining whether the workstation is connected to the server, and wherein the steps of copying an outdated file type designator datum and storing the file type designator datum from the server are performed only if the workstation is connected to the server.

46. The method of claim 43, wherein the step of transferring the at least one file type designator datum comprises the steps of:

identifying a user account to be accessed via the workstation;

determining whether an access to the program by the user account is authorized; and copying the file type designator datum to the workstation only if the access to the program by the user account is authorized.

47. The method of claim 42, wherein an icon indicia associated with the program is stored on the server, further comprising the steps of:

transferring the icon indicia from the server to the workstation; and displaying an icon corresponding to the icon indicia at the workstation.

48. The method of claim 42, further comprising the step of replicating at least one application object representing the program among a plurality of partitions.

49. A computer system, comprising:

a server, including a plurality of programs stored on the server, wherein each of the programs is associated with a file name format by at least one application object;

a workstation, wherein the workstation is selectably responsive to the server, comprising:

a memory, wherein said memory contains:

a plurality of files, wherein at least one of the files includes a file name and a file type designator; and a set of file type information in at least one application object attribute indicative of at least one of the plurality of programs as corresponding to the file type designator;

a file selector having access to the memory for designating the at least one of the files to be accessed; and an application launcher responsive to the file selector and having access to the memory, wherein the application launcher identifies the at least one of plurality of programs based on the file type information and the file type designator, initiates the identified program stored on the server, and formats the file name of the selected file in the file name format of the identified program.

50. The computer system of claim 49, wherein the workstation further comprises a retrieval system configured to be selectively connected to the server for retrieving a second set of file type information from the server and storing the second set of file type information in the workstation memory.

51. The computer system of claim 49, wherein the application launcher comprises:

an identifying system for identifying the at least one of the plurality of programs corresponding to the file type designator based on the file type information;

an initiation system for initiating the identified at least one of the plurality of programs associated with the file type designator; and a file name system for passing the file name to the initiated at least one of the plurality of programs in the file name format of the identified at least one of the plurality of programs.

52. The computer system of claim 49, wherein the at least one of the plurality of programs is associated with an icon indicia stored on the server and the application launcher is configured to be selectively connected to the server for retrieving the icon indicia from the server, the workstation further comprising a display system configured to display an icon corresponding to the icon indicia.

53. The computer system of claim 49, wherein the server includes a plurality of partitions, and the at least one of the plurality of programs and the file type information are replicated among the plurality of partitions.

54. The computer system of claim 49, wherein the workstation operates in conjunction with a selected user account among a plurality of user accounts on the server, access to the at least one of the plurality of programs is authorized for at least one of a plurality of user accounts, and wherein the application launcher initiates the at least one of the plurality of programs only if the selected user account is authorized to access the at least one of the plurality of programs.

55. The computer system of claim 49, wherein the workstation memory contains an outdated set of file type information at a first location in the workstation memory, and the application launcher selectively connects to the server for retrieving an updated set of file type information from the server, copies the outdated set of file type information to a second location in the workstation memory, and stores the updated set of file type information retrieved from the server at the first location in the workstation memory.

56. The computer system of claim 55, wherein the application launcher copies the outdated set of file type information to the second location in the workstation memory and stores the updated set of file type information retrieved from the server at the first location in the workstation memory only if the server is responsive to the workstation.

* * * * *